US009959225B2

(12) United States Patent
Tokunaga et al.

(10) Patent No.: US 9,959,225 B2
(45) Date of Patent: May 1, 2018

(54) COMPUTER APPARATUS AND CONTROL METHOD OF COMPUTER APPARATUS

(71) Applicants: Toshiro Tokunaga, Tokyo (JP); Atsushi Settsu, Tokyo (JP)

(72) Inventors: Toshiro Tokunaga, Tokyo (JP); Atsushi Settsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 14/650,630

(22) PCT Filed: Jan. 31, 2013

(86) PCT No.: PCT/JP2013/052205
§ 371 (c)(1),
(2) Date: Jun. 9, 2015

(87) PCT Pub. No.: WO2014/118940
PCT Pub. Date: Aug. 7, 2014

(65) Prior Publication Data
US 2015/0331816 A1   Nov. 19, 2015

(51) Int. Cl.
*G06F 13/24* (2006.01)
*G06F 9/445* (2018.01)
(Continued)

(52) U.S. Cl.
CPC .......... *G06F 13/24* (2013.01); *G06F 9/44505* (2013.01); *G06F 9/4812* (2013.01)

(58) Field of Classification Search
CPC ........ G06F 9/4403; G06F 13/24; G06F 9/445; G06F 17/30
See application file for complete search history.

(56) References Cited

U.S. PATENT DOCUMENTS 5,369,770 A    11/1994   Thomason et al.
5,790,846 A    8/1998    Mealey et al.
(Continued)

FOREIGN PATENT DOCUMENTS

CN    101320338 A    12/2008
CN    101373450 A    2/2009
(Continued)

OTHER PUBLICATIONS

International Search Report dated May 28, 2013 in PCT/JP2013/052205 Filed Jan. 31, 2013.
(Continued)

*Primary Examiner* — Henry Tsai
*Assistant Examiner* — Christopher A Daley
(74) *Attorney, Agent, or Firm* — Oblon, McClelland, Maier & Neustadt, L.L.P.

(57) ABSTRACT

At start-up of a computer apparatus, a CPU executes a first initialization procedure included in a RAS module to initialize resources to be used by the RAS module. After execution of the first initialization procedure, the CPU executes an initialization procedure included in an OS to initialize resources to be used by the OS. After execution of the initialization procedure, the CPU executes a second initialization procedure included in the RAS module to copy an interrupt determining part included in the OS to the RAS module, and to set the interrupt detection unit such that upon detecting an interrupt the interrupt detection unit calls an interrupt determining part copied to the RAS module, instead of the interrupt determining part in the OS.

9 Claims, 16 Drawing Sheets

(51) Int. Cl.
*G06F 9/48* (2006.01)
*G06F 17/30* (2006.01)

(56) References Cited

U.S. PATENT DOCUMENTS

| | | | |
|---|---|---|---|
| 7,725,642 B2 | 5/2010 | Tsushima et al. | |
| 8,145,819 B2* | 3/2012 | Alapati | G06F 9/4812 710/266 |
| 8,402,194 B2* | 3/2013 | Hoese | G06F 13/1668 710/11 |
| 8,522,236 B2* | 8/2013 | Zimmer | G06F 9/45558 718/1 |
| 9,454,380 B2* | 9/2016 | Kumar | G06F 17/30339 |
| 2005/0283599 A1* | 12/2005 | Zimmerman | G06F 9/4403 713/2 |
| 2006/0112307 A1* | 5/2006 | Marisetty | G06F 11/3672 714/11 |
| 2008/0163256 A1* | 7/2008 | Khanna | G06F 11/004 719/318 |
| 2008/0301402 A1 | 12/2008 | Alapati et al. | |
| 2009/0083736 A1 | 3/2009 | Goto | |
| 2009/0172661 A1* | 7/2009 | Zimmer | G06F 9/45558 718/1 |
| 2009/0204980 A1 | 8/2009 | Sandoval et al. | |
| 2012/0179932 A1* | 7/2012 | Armstrong | G06F 11/20 714/4.11 |
| 2013/0290585 A1* | 10/2013 | Marietta | G06F 13/14 710/240 |
| 2014/0281694 A1* | 9/2014 | Gotsubo | G06F 12/16 714/6.32 |
| 2015/0006978 A1* | 1/2015 | Tokunaga | G06F 11/0724 714/55 |
| 2015/0186322 A1* | 7/2015 | Yao | G06F 21/00 714/42 |

FOREIGN PATENT DOCUMENTS

| | | |
|---|---|---|
| JP | 64 53238 | 3/1989 |
| JP | 1 93830 | 4/1989 |
| JP | 8 16420 | 1/1996 |
| JP | 2004 13240 | 1/2004 |
| JP | 2004 287618 | 10/2004 |
| JP | 2006 155272 | 6/2006 |
| JP | 2008 217728 | 9/2008 |
| JP | 2009 80563 | 4/2009 |

OTHER PUBLICATIONS

Extended European Search Report dated Sep. 8, 2016 in Patent Application No. 13873790.3.
Combined Office Action and Search Report dated Jan. 3, 2017 in Chinese Patent Application No. 201380071709.4 with partial English translation and English translation of categories of cited documents.
Office Action dated Jul. 21, 2017 in Chinese Patent Application No. 201380071709.4 (with English translation).

* cited by examiner

COMPUTER APPARATUS AND CONTROL METHOD OF COMPUTER APPARATUS

TECHNICAL FIELD

The present invention relates to a technique for adding a RAS module which is a program for realizing a malfunction handling function (i.e., a RAS (Reliability, Availability, Serviceability) function) for handling a CPU (Central Processing Unit) exception to a computer apparatus on which an OS (Operating System) is implemented, without modifying the OS module.

The present invention also relates to a technique for adding a RAS module to a computer apparatus on which an OS and a hypervisor are implemented, without modifying the OS and hypervisor modules.

The hypervisor is software that realizes virtualization of the computer apparatus.

The hypervisor is software located between the OS and hardware of the computer apparatus and emulates the operation of the computer apparatus. The hypervisor allows a plurality of OSs to operate simultaneously on a single computer apparatus, and acts as an intermediary for communication and sharing of resources among the plurality of OSs.

A CPU exception is an exception in which the CPU is unable to continue normal processing (for example, division by zero, etc.).

It is arranged such that another program which is set in advance can be called upon occurrence of a CPU exception.

In the present Specification, both a CPU exception and an interrupt other than a CPU exception will be referred to using the term "interrupt".

Among the "interrupts", an interrupt other than a CPU exception will be referred to as a "regular interrupt" to be distinguished from a CPU exception.

BACKGROUND ART

In conventional art, in a computer apparatus in which each OS (there may be one OS or a plurality of OSs) and a hypervisor (the computer apparatus may be configured without a hypervisor) are operating as independent modules, a RAS function for handling a CPU exception is realized by a method such as adding a process for handling a CPU exception to each OS or the hypervisor.

For example, Patent Literature 1 discloses a configuration in which a VM monitor (corresponding to a hypervisor in the present Specification) is provided with means to extract failure information of a process being executed in a virtual computer which experienced a main system failure (corresponding to a CPU exception in the present Specification) from a failure information storage area.

For example, Patent Literature 2 discloses a technique for resolving an exception in a virtual computer on which a hypervisor is employed to operate a plurality of OSs.

Specifically, Patent Literature 2 discloses the technique for resolving an exception by copying to the hypervisor a memory image of the portion of a process being executed by an OS when the exception occurred and emulating a privileged instruction included in the process being executed by the OS when the exception occurred.

CITATION LIST

Patent Literature

Patent Literature 1: JP 01-053238 A
Patent Literature 2: JP 2006-155272 A

SUMMARY OF INVENTION

Technical Problem

Conventionally, in a computer system in which each OS (there may be one OS or a plurality of OSs) and a hypervisor (the computer system may be configured without a hypervisor) are configured as independent modules, it has been necessary to modify or change an interrupt detection unit provided in the OS, the hypervisor, or a CPU in order to add a RAS function corresponding to an exception process of the OS to the computer system.

For example, in the techniques disclosed in Patent Literature 1 and Patent Literature 2, the RAS function is realized by providing a function to handle a CPU exception in the hypervisor in advance.

For this reason, there is a problem, which is that adding the RAS function is difficult in a case where it is difficult to modify the OS or hypervisor module (including a case where a high level of technical difficulty leads to increased costs, a case where modification cannot be made for licensing reasons, and a case where modification is not desirable in terms of quality preservation).

The present invention mainly aims to solve the above-described problem.

That is, the present invention mainly aims to add a RAS module to a computer apparatus and to realize a RAS function appropriately without modifying an OS.

Solution to Problem

A computer apparatus according to the present invention includes a CPU (Central Processing Unit) including an interrupt detection unit that detects an interrupt; and an OS (Operating System) including an interrupt determining part that is called by the interrupt detection unit when the interrupt detection unit has detected an interrupt, and determines whether or not the interrupt detected by the interrupt detection unit is a CPU exception, wherein when a RAS (Reliability Availability Serviceability) module which is a program for carrying out a process to handle a CPU exception is added to the computer apparatus, at start-up of the computer apparatus the CPU calls a first initialization procedure included in the RAS module, and executes the first initialization procedure to initialize a resource to be used by the RAS module;

after execution of the first initialization procedure of the RAS module, the CPU calls an initialization procedure included in the OS, and executes the initialization procedure to initialize a resource to be used by the OS; and after execution of the initialization procedure of the OS, the CPU calls a second initialization procedure included in the RAS module, and executes the second initialization procedure to copy the interrupt determining part included in the OS to the RAS module, and to set the interrupt detection unit such that upon detecting an interrupt the interrupt detection unit calls an interrupt determining part copied to the RAS module, instead of the interrupt determining part in the OS.

Advantageous Effects of Invention

According to the present invention, a RAS module can be added to a computer apparatus without modifying an OS which is implemented on the computer apparatus, and when an interrupt detection unit of a CPU has detected an interrupt, the RAS module is called appropriately and a RAS function is realized.

DESCRIPTION OF EMBODIMENTS

The first to third embodiments hereinafter describe a computer apparatus in which one OS or a plurality of OSs and a hypervisor may operate.

More specifically, the computer apparatus and a control method of the computer apparatus are described in which a RAS module for handling a CPU exception can be added without modifying the OS or hypervisor module, and upon occurrence of a CPU exception the RAS module is called appropriately and the RAS module carries out a process to handle the CPU exception.

The first to third embodiments also describe the computer apparatus in which a RAS function is executed even if a failure occurs in the OS or the hypervisor concurrently with an occurrence of a CPU exception.

When it is configured that the OS or the hypervisor itself implements the RAS function, there is a problem, which is that the RAS function cannot be executed if a failure has also occurred in the OS or the hypervisor itself that was operating when a CPU exception occurred.

The first to third embodiments describe the computer apparatus that solves the above-described problem.

The first to third embodiments also describe the RAS module that can obtain failure information of the pertinent OS (or hypervisor) by determining the OS (or hypervisor) that was operating when a CPU exception occurred.

The RAS module is also described that can call an interrupt processing part properly upon occurrence of a regular interrupt, instead of a CPU exception, by referring to an interrupt determining part of the OS so as to call a corresponding interrupt processing part, even in a case where interrupt registration details have been changed in the OS (including a case where interrupt registration details have been changed dynamically after start-up of the computer apparatus and before occurrence of the interrupt).

First Embodiment

[First Embodiment: Description of Configuration]

Figure 1:
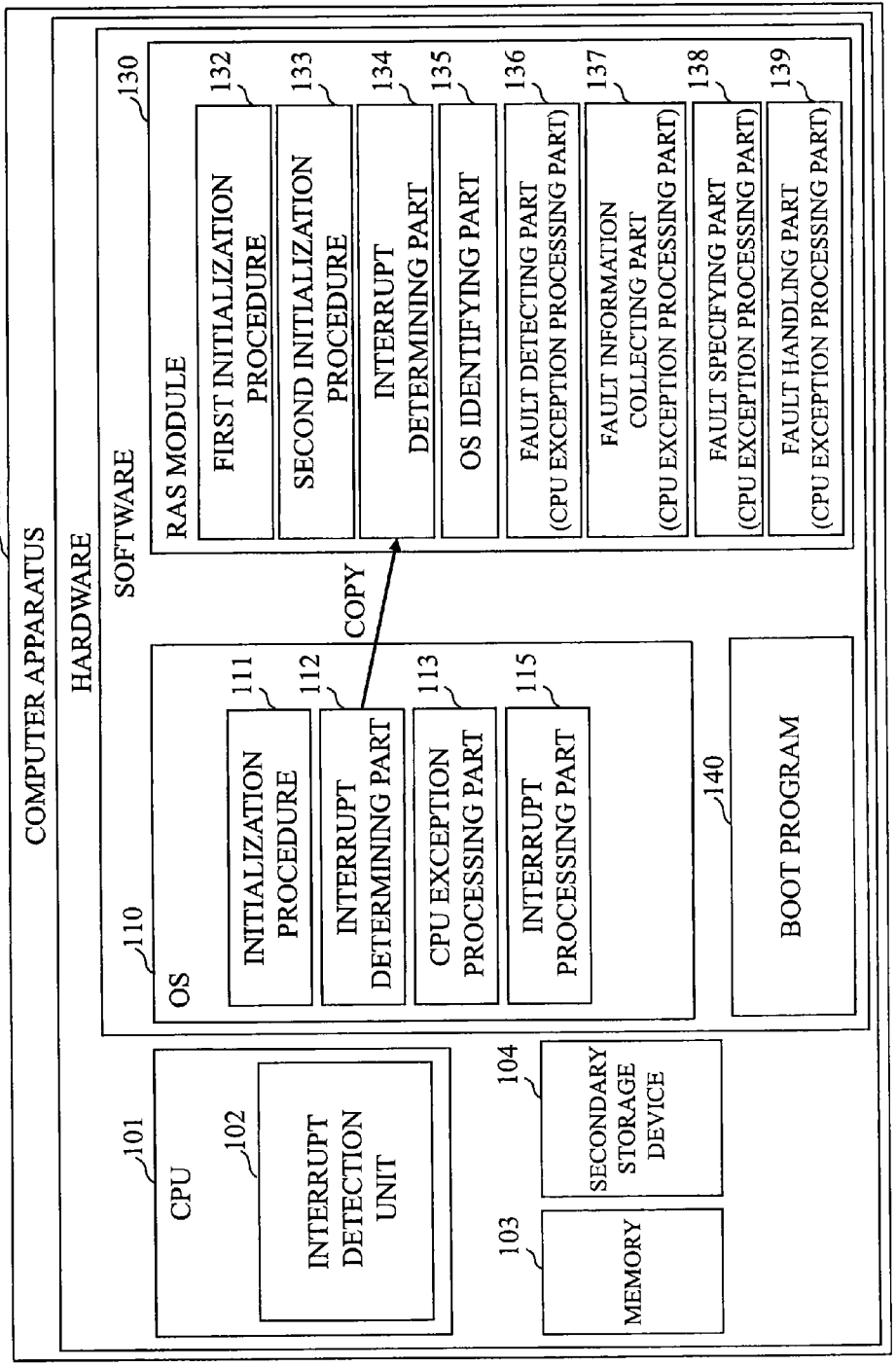
FIG. 1 is a diagram illustrating an example configuration of a computer apparatus according to a first embodiment.

FIG. 1 is a block diagram illustrating an example configuration of a computer apparatus (100) according to the first embodiment.

The computer apparatus (100) is configured with hardware and software.

The computer apparatus (100) includes a CPU (101), a memory (103), and a secondary storage device (104) as hardware.

The configuration may include one CPU (101) or a plurality of CPUs (101) (multiple cores, multiple CPUs, multiple processors, etc.).

The CPU (101) includes an interrupt detection unit (102).

The interrupt detection unit (102) detects an interrupt (a CPU exception and a regular interrupt).

The memory (103) is a RAM (Random Access Memory).

The secondary storage device (104) is, for example, a ROM (Read Only Memory), an HDD (Hard Disk Drive), or an SSD (Solid State Drive).

The software to be described later is stored in the secondary storage device (104), and is loaded from the secondary storage device (104) into the memory (103) for execution. The software is sequentially read from the memory (103) into the CPU (101) and is then executed.

Information, data, a variable value, and the like that are obtained as a result of executing the software to be described later are stored in the memory (103) and a register in the CPU (101).

Although not illustrated in FIG. 1, the computer apparatus (100) is provided with various devices including an input/output device and a communication device.

As the software of the computer apparatus (100), an OS (110), a RAS module (130), and a boot program (140) are included as separate modules.

The boot program (140) is executed when the computer apparatus (100) is started.

There may be one OS (110) or a plurality of OSs (110).

The OS (110) module includes an initialization procedure (111), an interrupt determining part (112), a CPU exception processing part (113), and an interrupt processing part (115).

The initialization procedure (111) is a program for initializing resources to be used by the OS (110).

The resources to be used by the OS (110) include both hardware resources and software resources.

The interrupt determining part (112) is a program that is called by the interrupt detection unit (102) when the interrupt detection unit (102) has detected an interrupt.

The interrupt determining part (112) determines whether the interrupt detected by the interrupt detection unit (102) is a CPU exception or a regular interrupt.

At start-up of the computer apparatus (100), the interrupt determining part (112) is copied to the RAS module (130) and becomes an interrupt determining part (134), and the setting of the interrupt detection unit (102) is changed such that the interrupt detection unit (102) calls the interrupt determining part (134) when the interrupt detection unit (102) has detected an interrupt, as will be described later.

For this reason, after the RAS module (130) has been added to the computer apparatus (100), the interrupt determining part (112) will not be called by the interrupt detection unit (102).

The CPU exception processing part (113) and the interrupt processing part (115) are programs that are executed upon occurrence of a regular interrupt which is not a CPU exception.

The operation of the CPU exception processing part (113) and the interrupt processing part (115) will be described in detail in the third embodiment.

The RAS module (130) is a program that carries out a process to handle a CPU exception.

The RAS module (130) includes a first initialization procedure (132), a second initialization procedure (133), the interrupt determining part (134), an OS identifying part (135), a fault detecting part (136), a fault information collecting part (137), a fault specifying part (138), and a fault handling part (139).

The RAS module (130) will also be referred to simply as the RAS.

The first initialization procedure (132) is a program that is executed before the initialization procedure (111) of the OS (110) is executed.

The first initialization procedure (132) initializes resources to be used by the RAS module (130).

The resources to be used by the RAS module (130) include both hardware resources and software resources.

The first initialization procedure (132) also carries out a process to rewrite the last portion of the program code of the initialization procedure (111) of the OS (110) such that the second initialization procedure (133) to be described later is executed.

The second initialization procedure (133) is a program that is executed after execution of the initialization procedure (111) of the OS (110).

The second initialization procedure (133) carries out a process to copy the interrupt determining part (112) included in the OS (110) to the RAS module (130), and to set the interrupt detection unit (102) such that upon detecting an interrupt the interrupt detection unit (102) calls the interrupt determining part (134) copied to the RAS module (130), instead of the interrupt determining part (112) of the OS (110).

As described above, the interrupt determining part (134) is the interrupt determining part (112) that has been copied to the RAS module (130).

For this reason, the interrupt determining part (134) carries out the same process as that carried out by the interrupt determining part (112).

That is, the interrupt determining part (134) determines whether the interrupt detected by the interrupt detection unit (102) is a CPU exception or a regular interrupt.

The OS identifying part (135) is a program that is executed when the interrupt determining part (134) determines that the interrupt detected by the interrupt detection unit (102) is a regular interrupt.

The OS identifying part (135) identifies the OS (110) that was operating when the interrupt occurred.

The operation of the OS identifying part (135) will be described in detail in the third embodiment.

The fault detecting part (136), the fault information collecting part (137), the fault specifying part (138), and the fault handling part (139) are programs that are executed when the interrupt determining part (134) determines that the interrupt detected by the interrupt detection unit (102) is a CPU exception.

The fault detecting part (136) identifies a fault that has caused the CPU exception.

The fault information collecting part (137) identifies the OS (110) that was operating when the CPU exception occurred, and collects information about the fault from the identified OS (110).

The fault specifying part (138) specifies a fault handling method corresponding to the fault, based on the information collected by the fault information collecting part (137).

The fault handling part (139) carries out the fault handling method specified by the fault specifying part (138).

The fault detecting part (136), the fault information collecting part (137), the fault specifying part (138), and the fault handling part (139) each correspond to an example of a CPU exception processing part.

The interrupt determining part (112) and the interrupt determining part (134) hold addresses, on the memory (103), of the processes (programs) for handling a CPU exception and a regular interrupt.

The interrupt processing part (115) holds the processes (programs) for handling an occurrence of an interrupt.

As described above, the OS (110), the RAS module (130), and the boot program (140) are programs. In the computer apparatus (100), the CPU (101) reads these programs and carries out processes according to the contents described in these programs.

In the following, it will be described that the CPU (101) carries out a process or the like. For ease of understanding and depending on the context, expressions may also be employed where the OS (110), the RAS module (130), or the boot program (140) is described as carrying out a process or the like, or an element (for example, the first initialization procedure (132)) included in these is described as carrying out a process or the like.

In the present Specification, even when the software is described as the subject that carries out a process or the like, the description means that the process is carried out by the CPU (101) executing a program.

[First Embodiment: Description of Outline of Operation (Outline of Overall Operation at Initialization)]

First, an outline of the overall operation at initialization of the computer apparatus (100) according to this embodiment will be described.

Figure 2:
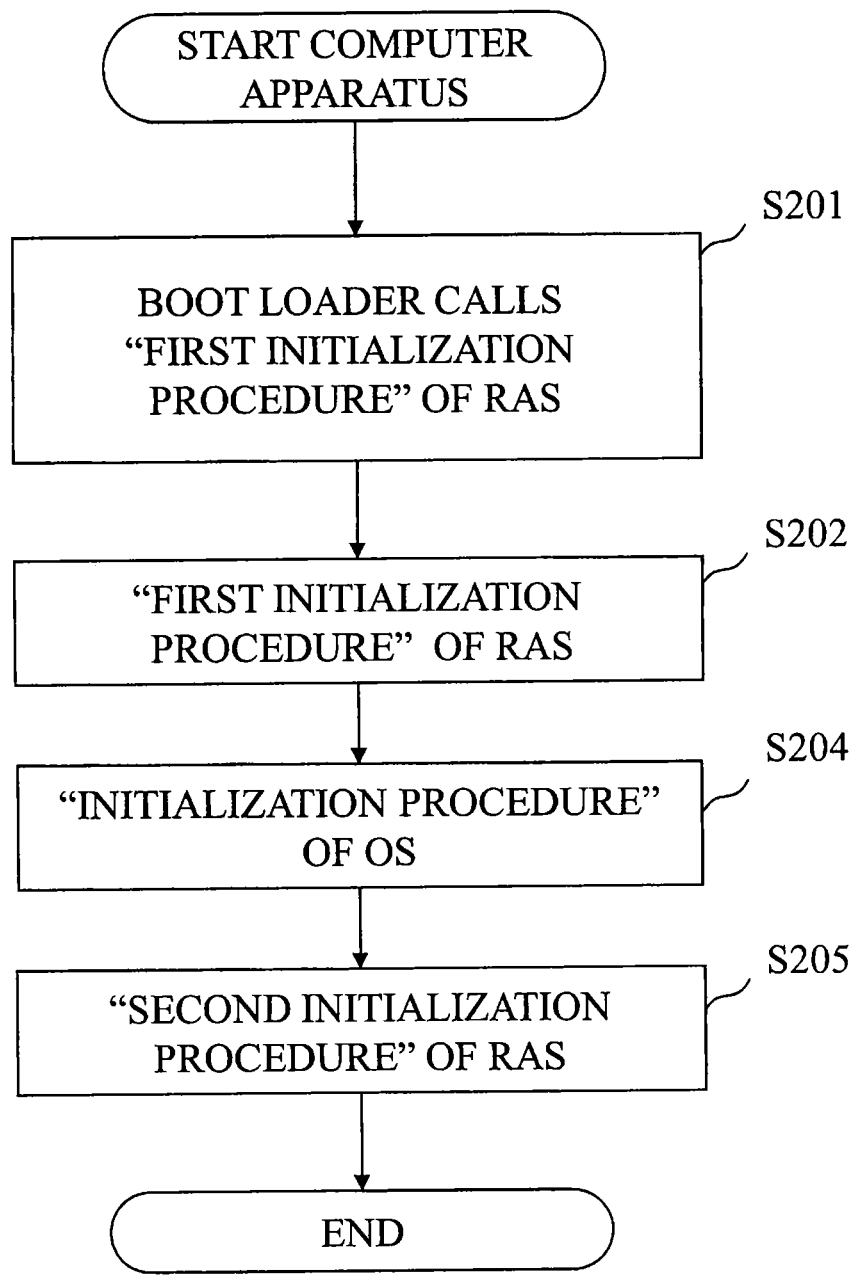
FIG. 2 is a flowchart diagram illustrating an outline of an initialization process in the computer apparatus according to the first embodiment.

FIG. 2 illustrates an overall flowchart of a process to initialize the RAS module (130) and the OS (110) at start-up of the computer apparatus (100) according to the first embodiment.

First, when the computer apparatus (100) is started, the boot program (140) is executed by the CPU (101). The first initialization procedure (132) of the RAS module (130) is called (S201), and the first initialization procedure (132) of the RAS module (130) is executed (S202).

The boot program (140) and the "first initialization procedure" of the RAS module (130) (S202) will be described in detail later.

Next, the initialization procedure (111) of the OS (110) is called, and the initialization procedure (111) of the OS (110) is executed (S204).

The "initialization procedure" of the OS (S204) will be described in detail later.

Lastly, the second initialization procedure (133) of the RAS module (130) is called, and the second initialization procedure (133) of the RAS module (130) is executed (S205).

The "second initialization procedure" of the RAS module (130) (S205) will be described in detail later.

When the computer apparatus (100) includes a plurality of OSs (110), the initialization procedure (111) of each OS (110) is executed sequentially in the "initialization procedure" of the OS (110) (S204).

[First Embodiment: Description of Outline of Operation (Operation of the "First Initialization Procedure" of the RAS Module)]

Next, the operation at initialization according to the first embodiment will be described in detail.

Figure 3:
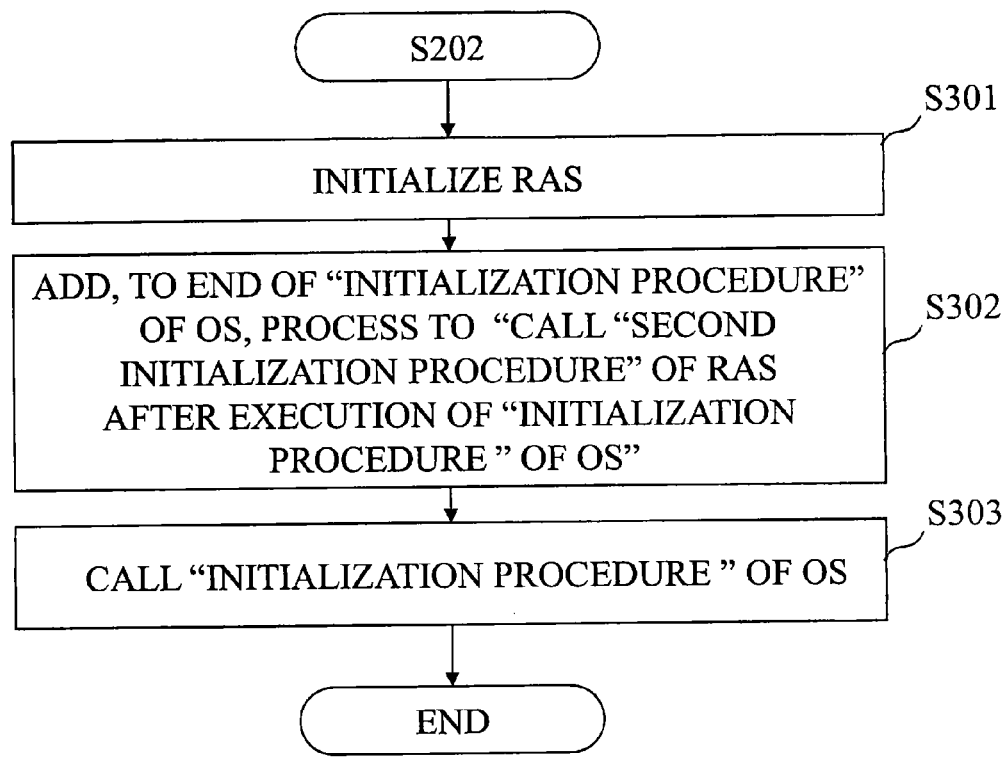
FIG. 3 is a flowchart diagram illustrating in detail a first initialization procedure of a RAS module according to the first embodiment.

FIG. 3 illustrates a detailed flowchart of the "first initialization procedure" of the RAS module (130) (S202) described above.

In the "first initialization procedure" (S202), the CPU (101) first executes the first initialization procedure (132) to initialize the RAS module (130) (S301).

In S301, the resources to be used by the RAS module (130) are initialized mainly.

Then, the CPU (101) carries out a process to add, to the end of the "initialization procedure" of the OS, a process to "call the "second initialization procedure" of the RAS module after execution of the "initialization procedure" of the OS" (S302).

Specifically, the second initialization procedure (133) of the RAS module (130) is a program located on the memory (103), which causes the last portion of the initialization procedure (111) of the OS to be rewritten such that the address, on the memory (103), of the program of the second initialization procedure (133) of the RAS module (130) is called at the end of the initialization procedure of the OS (110) (S204).

That is, the CPU (101) changes the last portion of the program code, stored in the memory (103), of the initialization procedure (111) of the OS (110) to a jump instruction to the program code of the second initialization procedure (133) of the RAS module (130).

A more specific example of a method for realizing this process is indicated in the following (1) to (4).

(1) It is arranged that the RAS module (130) can obtain the position of the code (i.e., the memory address of the program) and the size of the code of the initialization procedure (111) of the OS (110) from symbol information of a compiled executable file of the OS (110).

For example, it is arranged that the RAS module (130) can obtain the position and size of the code of the initialization procedure (111) of the OS (110) by employing a method in which the symbol information of the OS (110) is loaded into the memory (103) to allow the RAS module (130) to refer to the symbol information, or a method in which the symbol information of the OS (110) is captured into the RAS module (130) in advance (by hard coding, etc.).

(2) The first initialization procedure (132) of the RAS module (130) obtains the last code position of the initialization procedure (111) of the OS (110) from the code position and size information of the initialization procedure (111) of the OS (110) that have been made available in the above (1).

(3) In the portion of the last code position, a code (jump instruction) is written to return to the position from which the initialization procedure (111) of the OS (110) is called.

The first initialization procedure (132) of the RAS module (130) saves this position from which the call is made, and modifies the portion of the last code to a jump instruction to the code position of the second initialization procedure (133) of the RAS module (130).

(4) The first initialization procedure (132) of the RAS module (130) modifies the last portion of the code of the second initialization procedure (133) to a jump instruction to the position, saved in the above (3), from which the initialization procedure (111) of the OS (110) is called.

Then, the initialization procedure (111) of the OS (110) is called (S303).

Specifically, the memory address of the program of the initialization procedure (111) of the OS (110) is called.

[First Embodiment: Description of Outline of Operation (Operation of the "Initialization Procedure" of the OS")]

Figure 4:
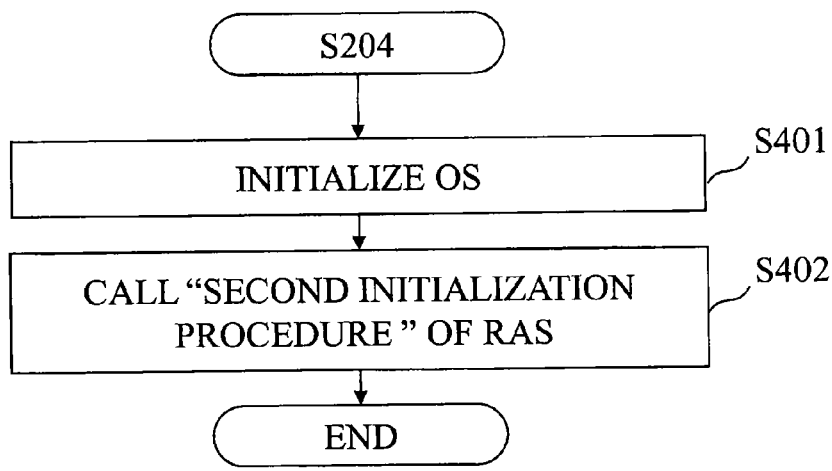
FIG. 4 is a flowchart diagram illustrating in detail an initialization procedure of an OS according to the first embodiment.

Next, FIG. 4 illustrates a detailed flowchart of the "initialization procedure" of the OS (110) (S204) described above.

Here, the CPU (101) initializes the OS (110) (S401).

In S401, a process to initialize the resources to be used by the OS (110) itself is carried out mainly.

Then, in accordance with the code rewritten in the "first initialization procedure" of the RAS module (130) (S202) as described above, the CPU (101) calls the second initialization procedure (133) of the RAS module (130) (S402).

Specifically, the CPU (101) realizes this by calling the memory address of the program of the second initialization procedure (133) of the RAS module (130).

[First Embodiment: Description of Outline of Operation (Operation of the "Second Initialization Procedure" of the RAS Module)]

Figure 5:
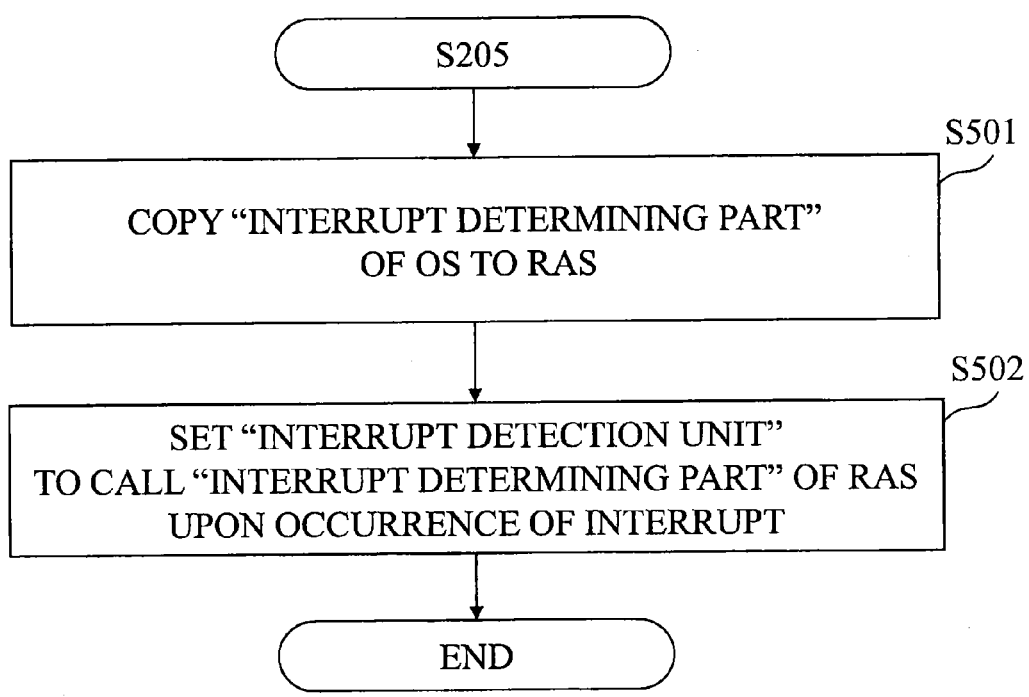
FIG. 5 is a flowchart diagram illustrating in detail a second initialization procedure of the RAS module according to the first embodiment.

Lastly, FIG. 5 illustrates a detailed flowchart of the "second initialization procedure" (S205) of the RAS module (130) described above.

Here, the CPU (101) copies the program code of the interrupt determining part (112) of the OS (110) to the RAS module (130) (S501).

The interrupt determining part (112) that has been copied to the RAS module (130) becomes the interrupt determining part (134).

Then, the CPU (101) carries out a process to set the interrupt detection unit (102) such that upon occurrence of an interrupt the interrupt detection unit (102) calls the interrupt determining part (134) of the RAS module (130) (S502).

[First Embodiment: Description of Outline of Operation (Method for Adding the RAS Module)]

The above has described the initialization operation at start-up in the configuration to which the RAS module (130) has been added. In the following, a method for adding the RAS module (130) to the computer apparatus (100) will be described.

Figure 16:
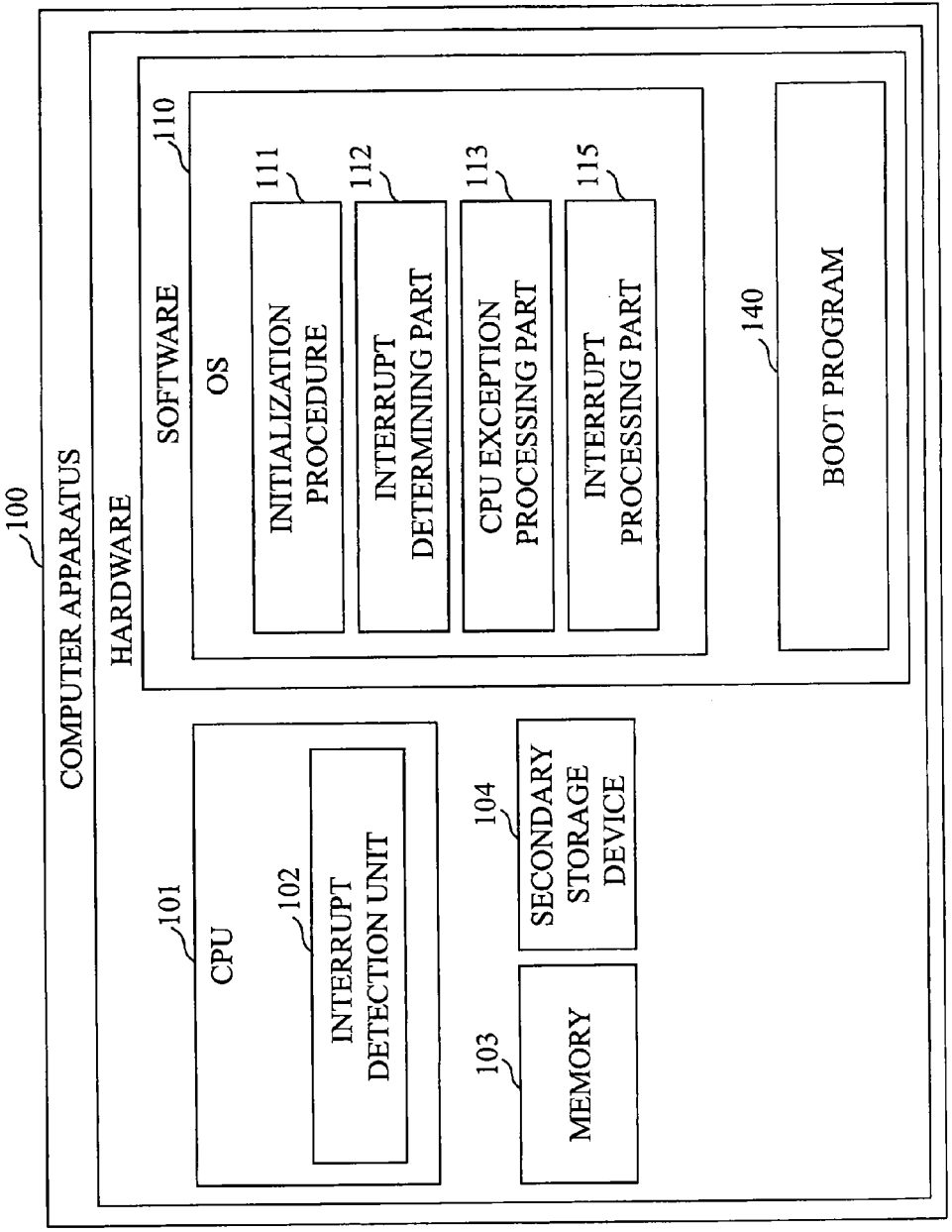
FIG. 16 is a diagram illustrating an example configuration of the computer apparatus according to the first embodiment before the RAS module is added.

FIG. 16 illustrates an example configuration of the computer apparatus (100) before the RAS module (130) is added.

In the computer apparatus (100) before the RAS module (130) is added, each OS (the configuration may include one OS or a plurality of OSs) is configured as an independent module.

Before the RAS module (130) is added, the computer apparatus (100) performs normal operation without the RAS module (130), as illustrated in FIG. 16.

At start-up of the computer apparatus (100) of FIG. 16, the boot program (140) on the computer apparatus (100) starts up first, and the initialization procedure (111) of the OS (110) is called from the boot program (140).

To add the RAS module (130) according to this embodiment to the computer apparatus (100) of FIG. 16, the program of the RAS module (130) to be added is first placed in free space on the secondary storage device (104) of the computer apparatus (100).

Also, the boot program (140) of the computer apparatus (100) is changed such that at start-up of the computer apparatus (100) the boot program (140) calls the first initialization procedure (132) of the RAS module (130).

Specifically, the boot program (140) is changed such that the address, on the memory (103), of the program of the first initialization procedure (132) of the RAS module (130) is called from the boot program (140).

The above is the outline of the method for adding the RAS module (130) to the computer apparatus (100).

When the computer apparatus (100) is started after the RAS module (130) has been added to the computer apparatus (100) as described above (as illustrated in FIG. 1), the operation as illustrated in the flowchart of FIG. 2 is performed.

With the above-described configuration and operation, the RAS function corresponding to the interrupt determining part provided in the OS can be easily added, without modifying the OS module, to the computer apparatus in which each OS (the configuration may include one OS or a plurality of OSs) is configured as an independent module.

[First Embodiment: Description of Outline of Operation (Outline of Operation Upon Occurrence of an Interrupt)]

Next, an outline of the operation of the computer apparatus (100) according to the first embodiment upon occurrence of an interrupt will be described.

Figure 6:
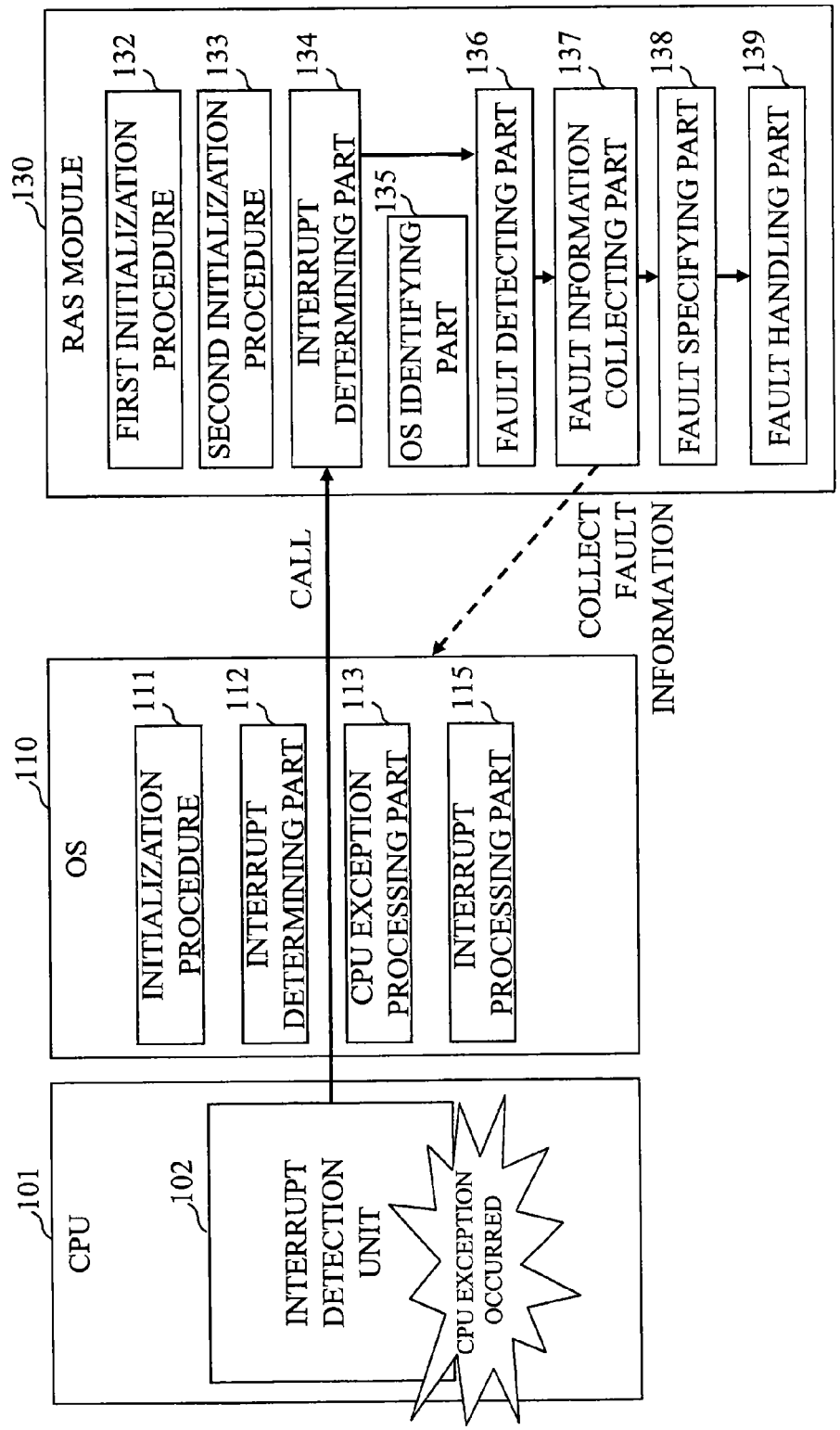
FIG. 6 is a diagram illustrating an example of operation upon occurrence of a CPU exception in the computer apparatus according to the first embodiment.

FIG. 6 illustrates a flow of processing upon occurrence of an interrupt while the OS (110) is operating.

Here, there may be a plurality of OSs.

In FIG. 6, the memory (103), the secondary storage device (104), and the boot program (140) which are not directly relevant to the description are not illustrated.

In FIG. 6, a solid arrow indicates the flow of processing, and a dashed arrow indicates the content of processing.

Upon occurrence of an interrupt, the interrupt detection unit (102) of the CPU (101) calls the RAS module (130).

The RAS module (130) determines whether or not the interrupt that has occurred is a CPU exception.

Then, if the interrupt that has occurred is a CPU exception, the RAS module (130) determines the OS that was operating based on a program counter (a register holding the address being executed by the CPU) of the computer apparatus (100) (determines the OS that was operating based on the location of the code being executed which is held in the program counter), identifies the pertinent OS, and collects fault information from the identified OS.

With this operation, it is possible in the configuration including a plurality of OSs to determine the OS that was operating when the CPU exception occurred and to collect fault information from the pertinent OS.

[First Embodiment: Description of Outline of Operation (Flowchart for when an Interrupt has Occurred)]

Figure 7:
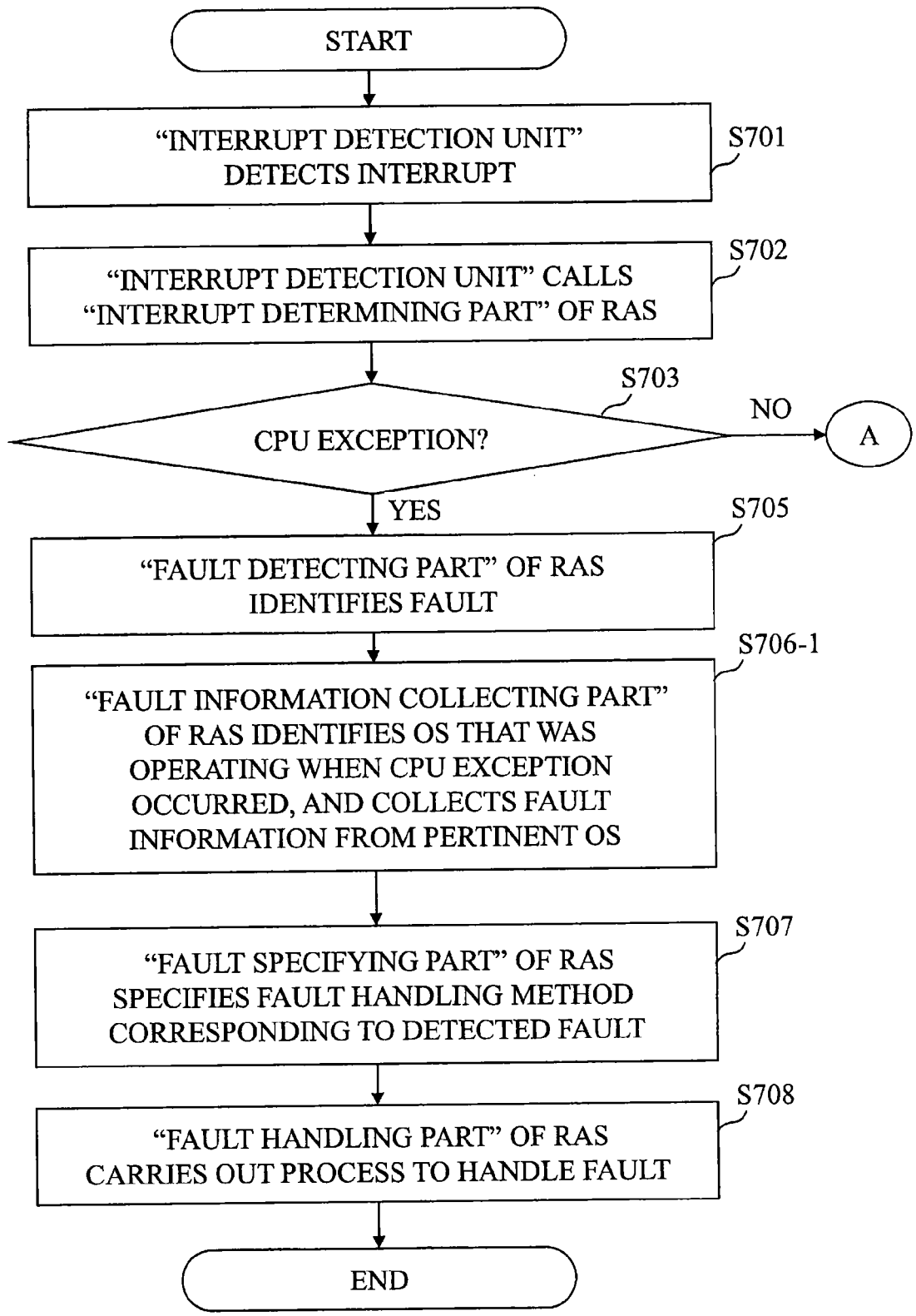
FIG. 7 is a flowchart diagram illustrating an example of operation upon occurrence of a CPU exception in the computer apparatus according to the first embodiment.

FIG. 7 illustrates a flowchart for when an interrupt has occurred.

First, the interrupt detection unit (102) detects an interrupt (S701).

Then, the interrupt detection unit (102) calls the interrupt determining part (134) of the RAS module (130) (S702).

The interrupt determining part (134) determines whether the interrupt detected by the interrupt detection unit (102) is a CPU exception or a regular interrupt (S703).

Figure 15:
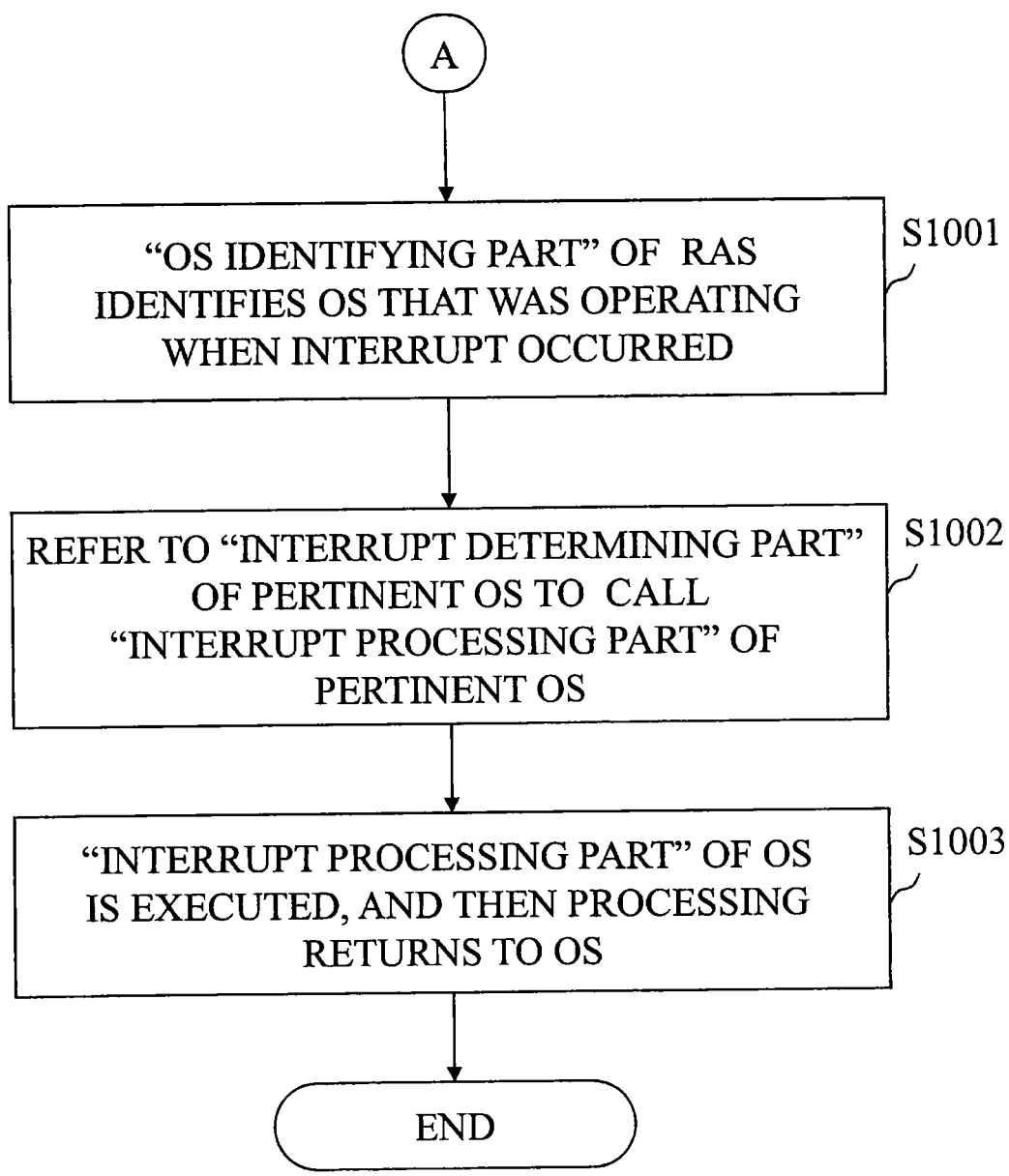
FIG. 15 is a flowchart diagram illustrating an example of operation upon occurrence of an interrupt in the computer apparatus according to the third embodiment.

If the interrupt detected by the interrupt detection unit (102) is a regular interrupt (NO in S703), processing transitions to S1001 of FIG. 15.

The flowchart of FIG. 15 will be described in detail in the third embodiment.

On the other hand, if the interrupt detected by the interrupt detection unit (102) is a CPU exception (YES in S703), the fault detecting part (136) of the RAS module (130) identifies a fault that caused the CPU exception (S705).

Then, the fault information collecting part (137) of the RAS module (130) identifies the OS (110) that was operating when the CPU exception occurred, and collects fault information from the pertinent OS (110) (S706-1).

As described above, the fault information collecting part (137) of the RAS module (130) identifies the OS (110) that was operating when the CPU exception occurred, based on the program counter of the computer apparatus (100).

Then, the fault specifying part (138) of the RAS module (130) specifies a fault handling method corresponding to the fault identified in S705 (S707).

Lastly, the fault handling part (139) of the RAS module (130) carries out a process to handle the fault in accordance with the fault handling method specified in S707 (S708).

According to the first embodiment, by executing the interrupt determining part (134), the fault detecting part (136), and so on in the RAS module (130) upon occurrence of a CPU exception, the RAS function can be executed even if the CPU exception has occurred concurrently with a failure in the OS.

This embodiment has described a RAS scheme, according to which the RAS function corresponding to the interrupt determining part provided in the OS can be added, without modifying the OS module, to the computer apparatus in which each OS (the configuration may include one OS or a plurality of OSs) is configured as an independent module.

More specifically, this embodiment has described the following (1) to (4).

(1) The "initialization procedure" of the RAS module which is called at start-up of the computer apparatus is divided into the "first initialization procedure" which is executed before the "initialization procedure" of the OS and the "second initialization procedure" which is executed after completion of the "initialization procedure" of the OS.

(2) In the "first initialization procedure" of the RAS module, the last portion of the "initialization procedure" of the OS is rewritten to call the "second initialization procedure" of the RAS module after the "initialization procedure" of the OS.

(3) In the "second initialization procedure" of the RAS module, the "interrupt determining part" of the OS is copied to the RAS module.

(4) In the "second initialization procedure" of the RAS module, the "interrupt detection unit" is set to call the "interrupt determining part" of the RAS module, instead of the "interrupt determining part" of the OS, upon occurrence of an interrupt.

This embodiment has also described the RAS scheme, according to which by executing the interrupt determining part, the fault detecting part, and so on in the RAS module upon occurrence of a CPU exception, the RAS function is executed even if the CPU exception has occurred concurrently with a failure in the OS.

This embodiment has also described the RAS scheme, according to which by executing the fault information collecting part in the RAS module, it is possible to determine the OS that was operating when a CPU exception occurred based on the program counter of the time when the CPU exception occurred, and to collect failure information from the pertinent OS.

Second Embodiment

[Second Embodiment: Description of Configuration]

Figure 8:
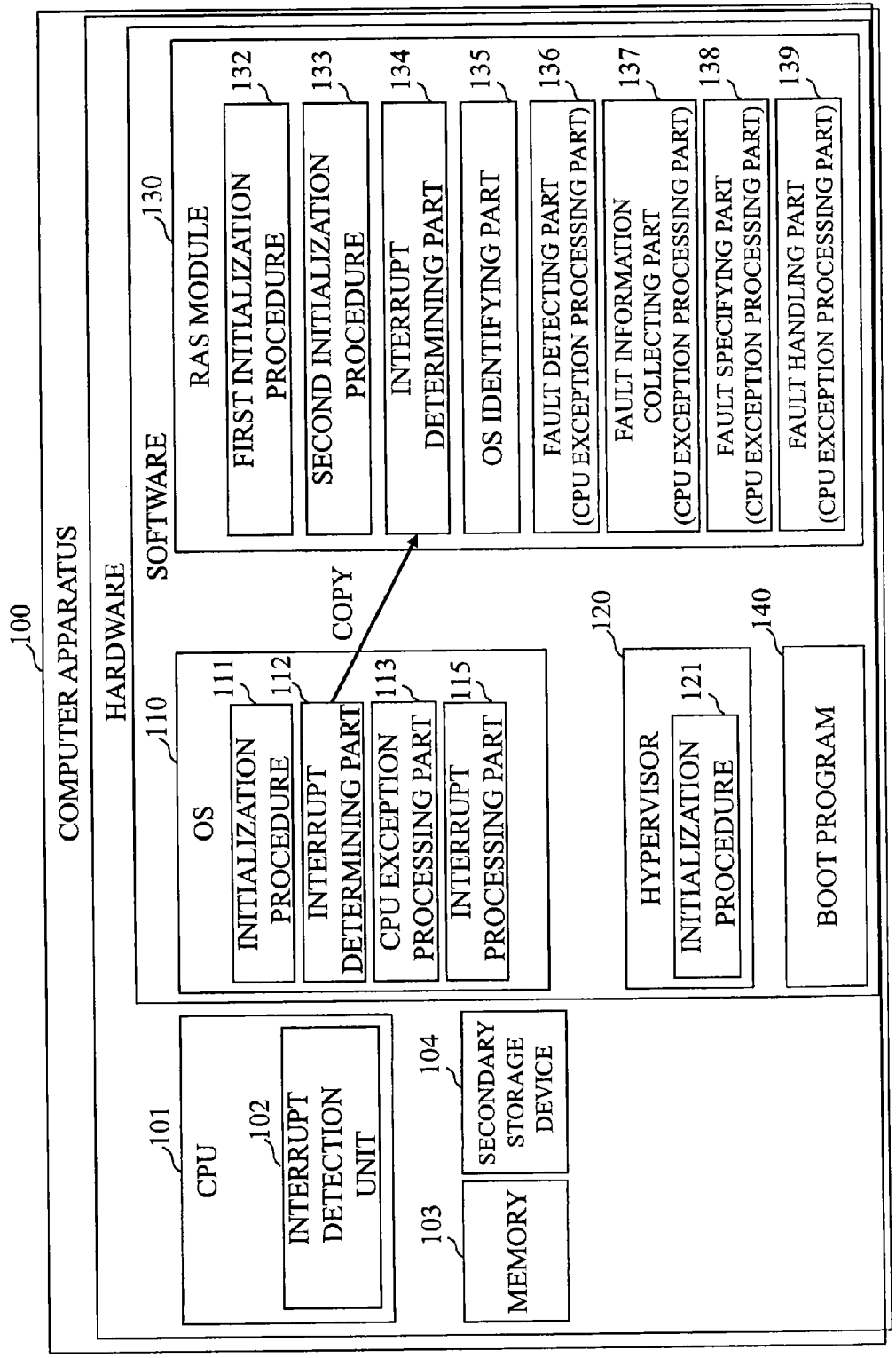
FIG. 8 is a diagram illustrating an example configuration of the computer apparatus according to a second embodiment.

FIG. 8 is a block diagram illustrating an example configuration of the computer apparatus (100) according to the second embodiment.

The only difference from the configuration of the first embodiment (FIG. 1) is that a hypervisor (120) and an initialization procedure (121) of the hypervisor (120) are included, and the rest are the same as those of the configuration of the first embodiment (FIG. 1).

The configuration may include one OS (110) or a plurality of OSs (110) also in this embodiment.

The configuration may also include one CPU (101) or a plurality of CPUs (101) (multiple cores, multiple CPUs, multiple processors, etc.).

[Second Embodiment: Description of Outline of Operation (Outline of Overall Operation at Initialization)]

As the description of the operation according to the second embodiment, an outline of the overall operation at initialization will be described first.

Figure 9:
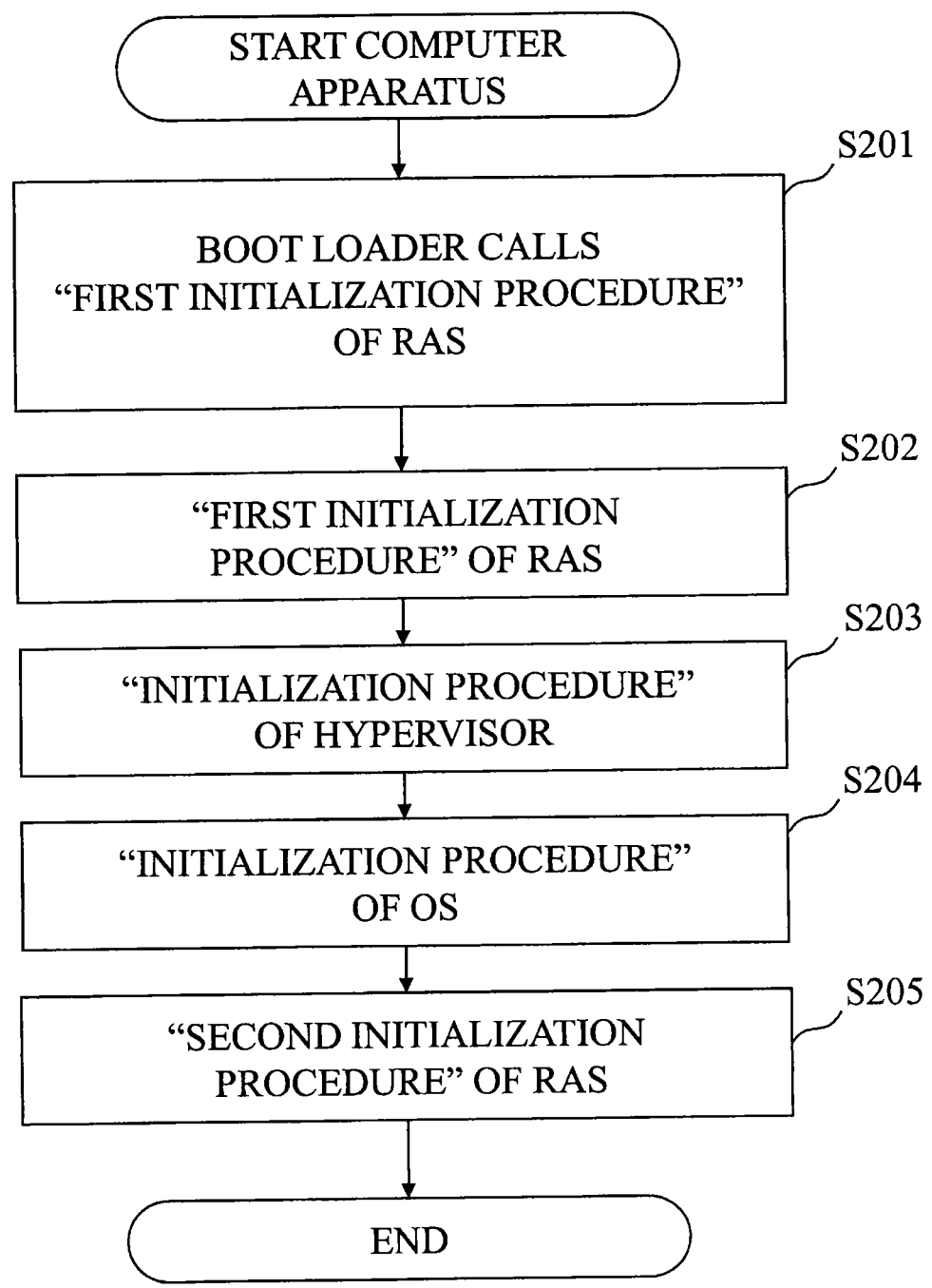
FIG. 9 is a flowchart diagram illustrating an outline of an initialization process in the computer apparatus according to the second embodiment.

FIG. 9 illustrates an overall flow of a process to initialize the RAS module (130), the OS (110) module, and the hypervisor (120) module at start-up of the computer apparatus (100) according to the second embodiment.

Here, the difference from the operation at initialization according to the first embodiment (FIG. 2) is that the "initialization procedure" of the hypervisor (S203) is added between the process in S202 and S204, and the rest of the flow is the same as the flow of the first embodiment (FIG. 2).

For this reason, the process in S203 and before and after S203 will be mainly described here.

First, the flow of FIG. 9 up to the end of the "first initialization procedure" of the RAS module (S202) is the same as that of the first embodiment.

Then, the initialization procedure (121) of the hypervisor (120) is called and executed (S203).

In S203, the CPU (101) mainly initializes resources to be used by the hypervisor (120).

Then, the flow of FIG. 9 at and after the "initialization procedure" of the OS (S204) is the same as that of the first embodiment.

The details of S205 are as illustrated in FIG. 5 of the first embodiment.

When the configuration includes a plurality of OSs, the initialization procedure (111) of each OS (110) is executed sequentially in the "initialization procedure" of the OS (S204) in the flowchart of FIG. 9.

[Second Embodiment: Description of Outline of Operation (Operation of the "First Initialization Procedure" of the RAS Module)]

Next, the operation at initialization according to the second embodiment will be described in detail.

Figure 10:
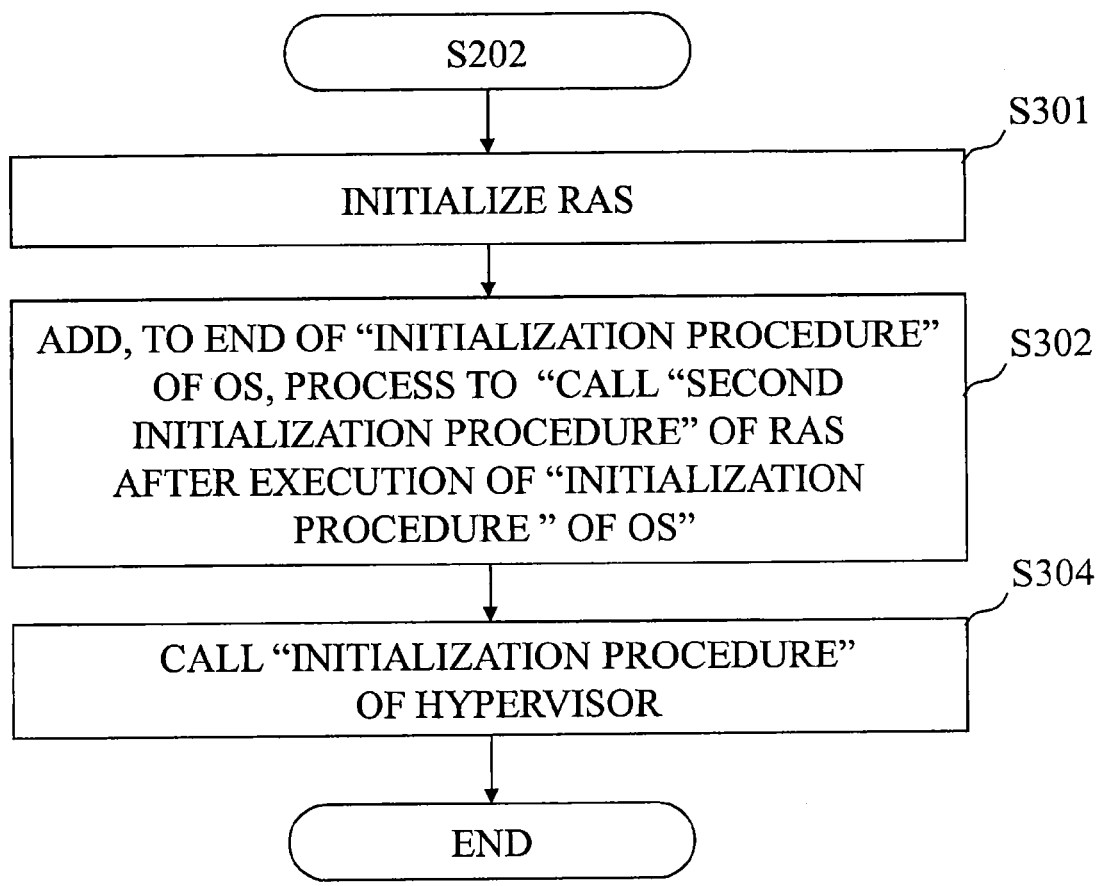
FIG. 10 is a flowchart diagram illustrating in detail a first initialization procedure of the RAS module according to the second embodiment.

FIG. 10 illustrates a detailed flow of the "first initialization procedure" of the RAS module (S202) described above.

Here, the only difference from the "first initialization procedure" of the RAS module of the first embodiment (FIG. 3) is that in the last step the "initialization procedure" of the hypervisor is called (S304 of FIG. 10), instead of the "initialization procedure" of the OS being called (S303 of FIG. 3). Thus, only this portion will be described.

In S304, the CPU (101) calls the initialization procedure (121) of the hypervisor (120).

Specifically, the CPU (101) realizes this by calling the address, on the memory (103), of the program of the initialization procedure (121) of the hypervisor (120).

[Second Embodiment: Description of Outline of Operation (Method for Adding the RAS Module)]

The above has described the initialization operation at start-up in the configuration to which the RAS module (130) has been added. In the following, a method for adding the RAS module (130) to the computer apparatus (100) will be described.

Figure 17:
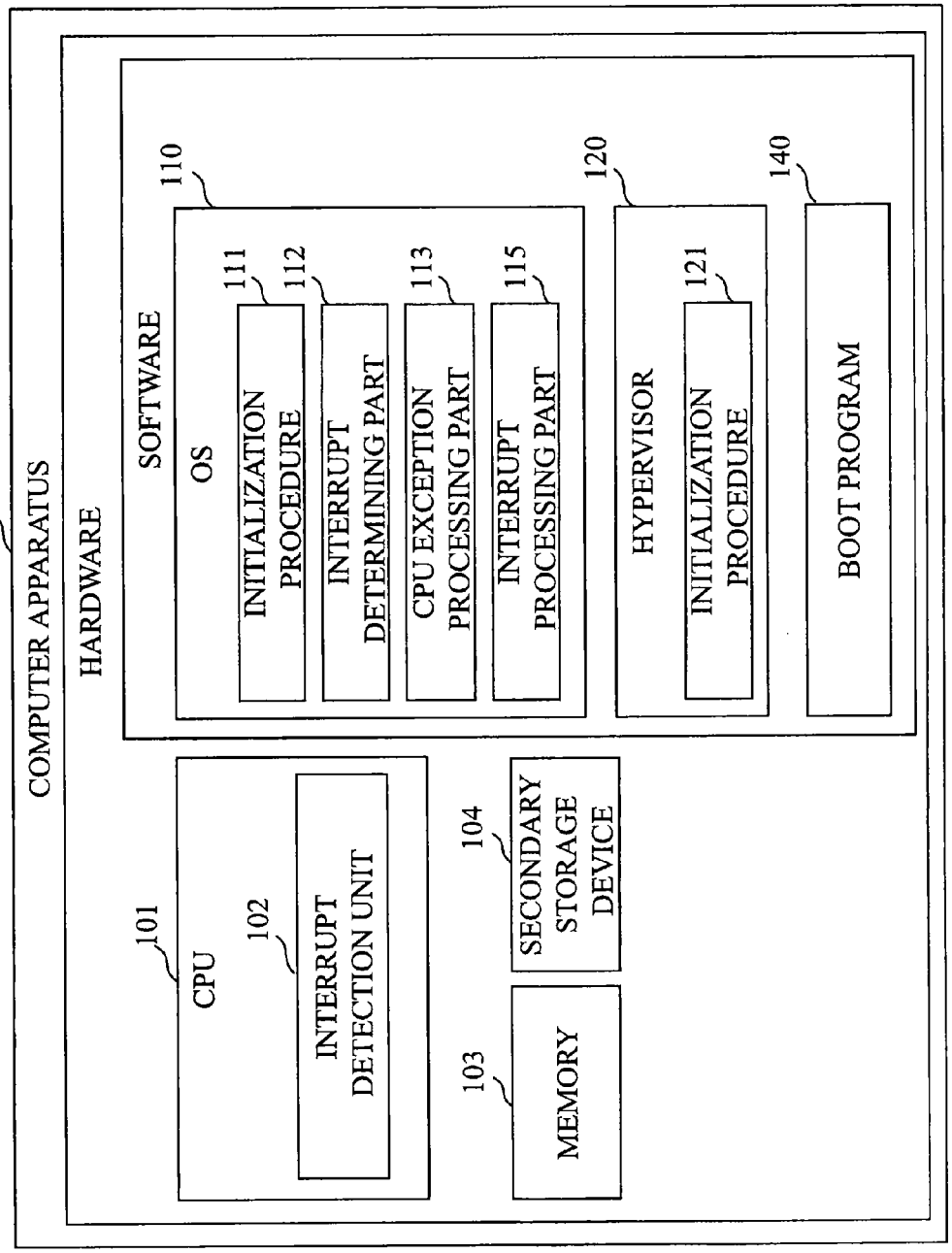
FIG. 17 is a diagram illustrating an example configuration of the computer apparatus according to the second embodiment before the RAS module is added.

FIG. 17 illustrates an example configuration of the computer apparatus (100) before the RAS module (130) is added.

In the computer apparatus (100) before the RAS module (130) is added, each OS (the configuration may include one OS or a plurality of OSs) and the hypervisor are configured as independent modules.

Before the RAS module (130) is added, the computer apparatus (100) performs normal operation without the RAS module (130), as illustrated in FIG. 17.

At start-up of the computer apparatus (100) of FIG. 17, the boot program (140) on the computer apparatus (100) starts up first. The initialization procedure (121) of the hypervisor (120) is called from the boot program (140), and the initialization procedure (111) of the OS (110) is called from the initialization procedure (121) of the hypervisor (120).

To add the RAS module (130) according to this embodiment to the computer apparatus (100) of FIG. 17, the program of the RAS module (130) to be added is first placed in free space on the secondary storage device (104) of the computer apparatus (100).

Also, the boot program (140) of the computer apparatus (100) is changed such that at start-up of the computer apparatus (100) the boot program (140) calls the first initialization procedure (132) of the RAS module (130).

Specifically, the boot program (140) is changed such that the address, on the memory (103), of the program of the first initialization procedure (132) of the RAS module (130) is called from the boot program (140).

The above is the outline of the method for adding the RAS module (130) to the computer apparatus (100).

When the computer apparatus (100) is started after the RAS module (130) has been added to the computer apparatus (100) as described above (as illustrated in FIG. 8), the operation as illustrated in the flowchart of FIG. 9 described above is performed.

With the above-described configuration and operation, the RAS function corresponding to the interrupt determining part provided in the OS can be easily added, without modifying the OS or hypervisor module, to the computer apparatus in which each OS (the configuration may include one OS or a plurality of OSs) and the hypervisor are configured as independent modules.

[Second Embodiment: Description of Outline of Operation (Outline of Operation Upon Occurrence of an Interrupt)]

Next, an outline of the operation of the computer apparatus (100) according to the second embodiment upon occurrence of an interrupt will be described.

Figure 11:
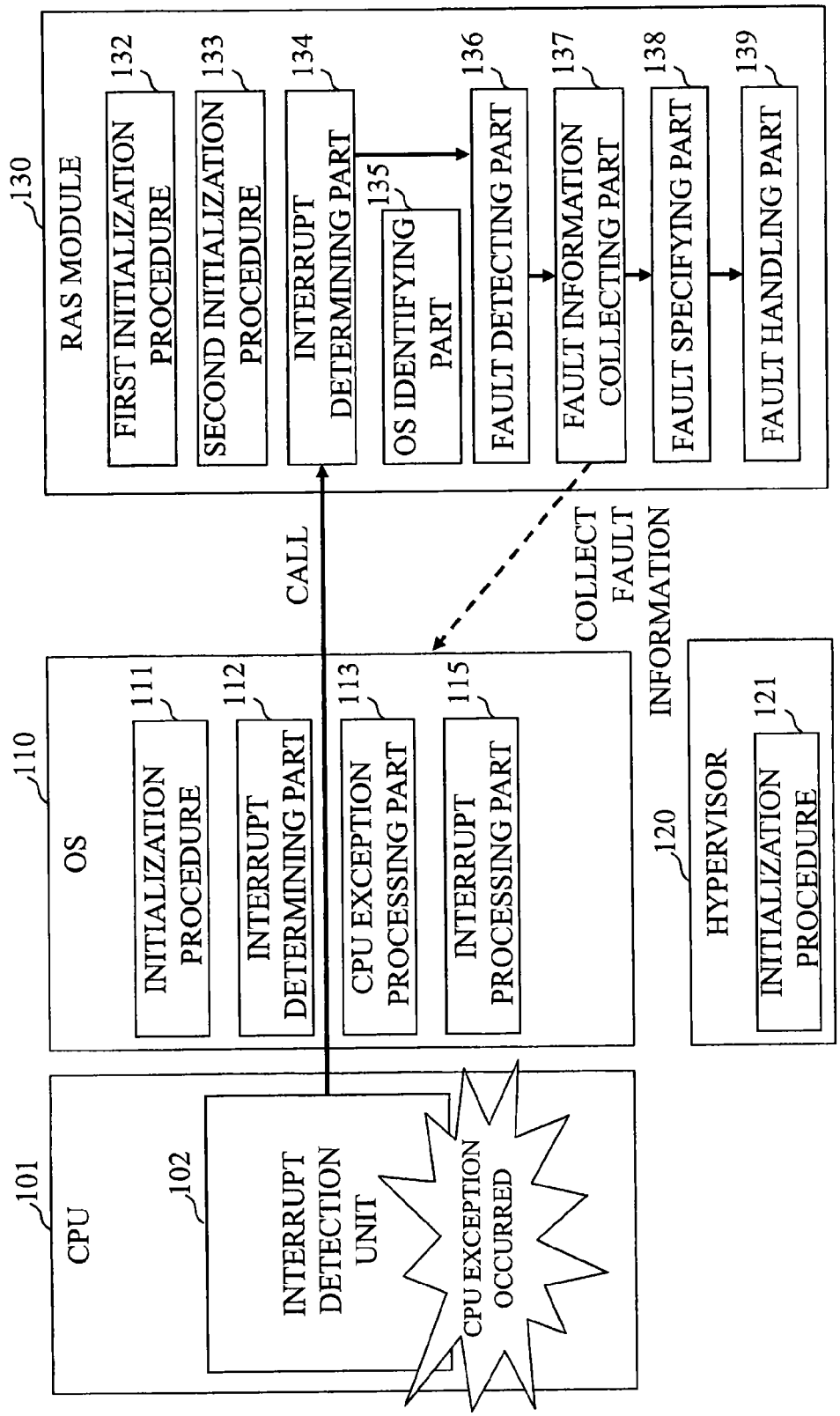
FIG. 11 is a diagram illustrating an example of operation upon occurrence of a CPU exception in the computer apparatus according to the second embodiment.

FIG. 11 illustrates a flow of processing upon occurrence of an interrupt while the OS (110) is operating.

Here, there may be a plurality of OSs.

Figure 12:
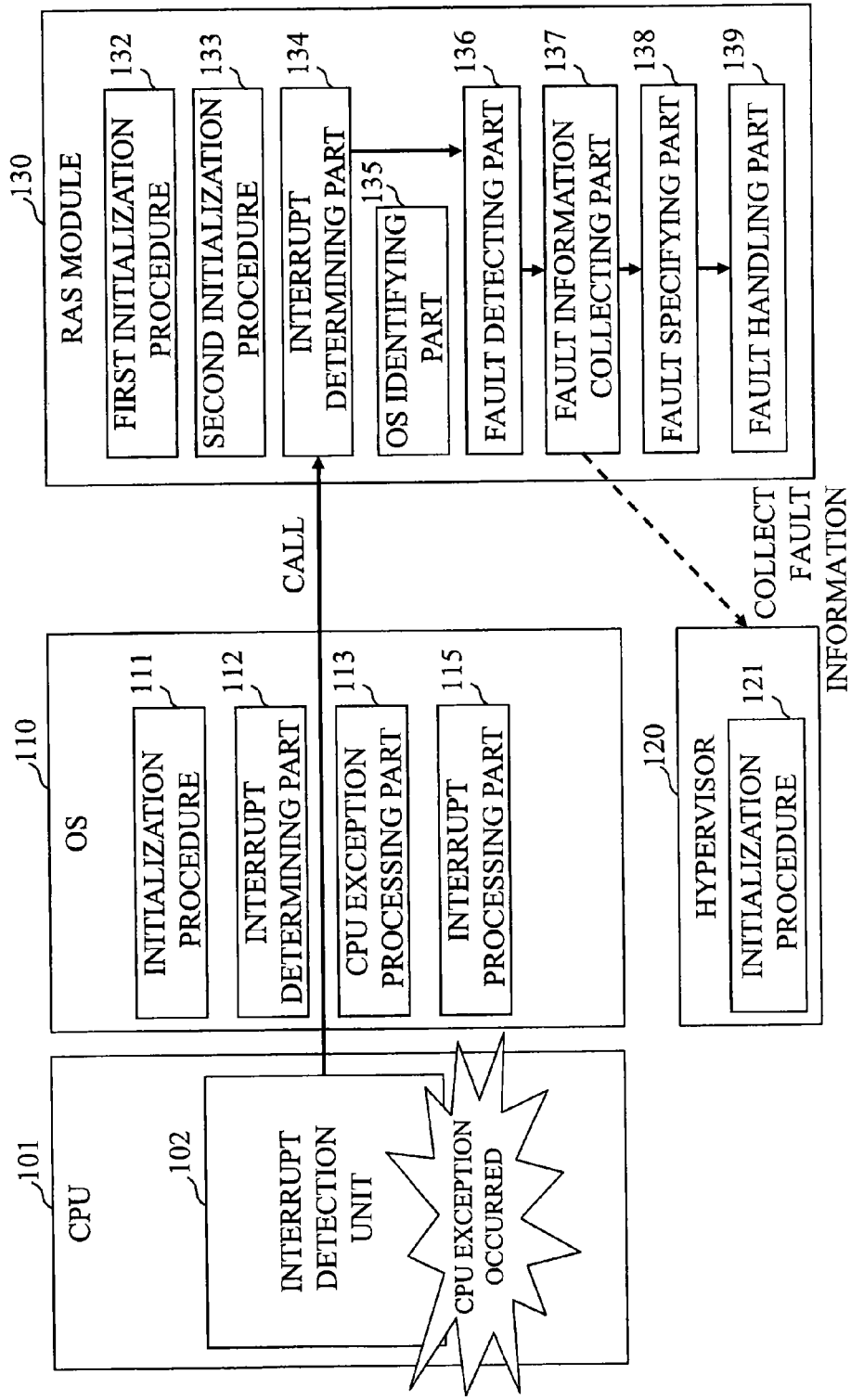
FIG. 12 is a diagram illustrating an example of operation upon occurrence of a CPU exception in the computer apparatus according to the second embodiment.

FIG. 12 illustrates a flow of processing upon occurrence of an interrupt while the hypervisor (120) is operating.

FIG. 11 and FIG. 12 differ only in that whether the fault information collecting part (137) of the RAS module (130) collects fault information of the OS or collects fault information of the hypervisor.

In FIG. 11 and FIG. 12, the memory (103), the secondary storage device (104), and the boot program (140) which are not directly relevant to the description are not illustrated.

In FIG. 11 and FIG. 12, a solid arrow indicates the flow of processing, and a dashed arrow indicates the content of processing.

Upon occurrence of an interrupt, the interrupt detection unit (102) of the CPU (101) calls the RAS module (130).

The RAS module (130) determines whether or not the interrupt that has occurred is a CPU exception.

Then, if the interrupt that has occurred is a CPU exception, the RAS module (130) determines the OS or hypervisor that was operating when the CPU exception occurred based on the program counter (the register holding the address being executed by the CPU) of the computer apparatus (100) (determines the OS or hypervisor that was operating based on the location of the code being executed which is held in the program counter), identifies the pertinent OS or hypervisor, and collects fault information from the identified OS or hypervisor.

With this operation, it is possible to determine the OS (the configuration may include one OS or a plurality of OSs) or hypervisor that was operating when the CPU exception occurred, and to collect fault information from the pertinent OS or hypervisor.

[Second Embodiment: Description of Outline of Operation (Flowchart for when an Interrupt has Occurred)]

Figure 13:
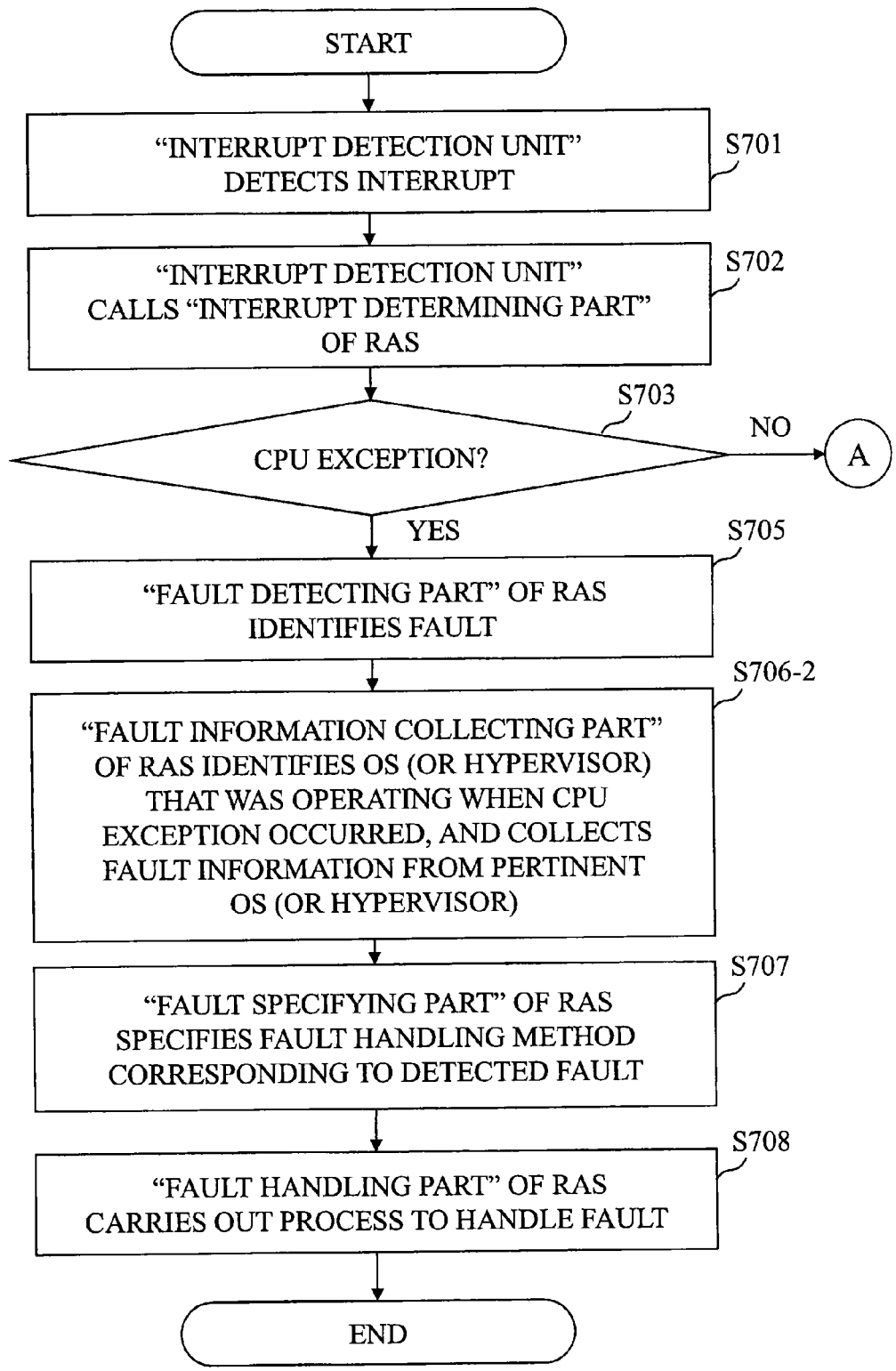
FIG. 13 is a flowchart diagram illustrating an example of operation upon occurrence of a CPU exception in the computer apparatus according to the second embodiment.

FIG. 13 illustrates a flowchart for when an interrupt has occurred.

The only difference between this flowchart and the flowchart of FIG. 7 of the first embodiment is that the process in S706-1 is replaced with the process in S706-2.

Thus, only the process in S706-2 will be described hereinafter.

After the fault detecting part (136) of the RAS module (130) has identified the pertinent fault (S705), the fault information collecting part (137) of the RAS module (130) identifies the OS (or hypervisor) that was operating when the CPU exception occurred, and collects fault information from the pertinent OS (or hypervisor) (S706-2).

As described above, the fault information collecting part (137) of the RAS module (130) identifies the OS (or hypervisor) that was operating when the CPU exception occurred, based on the program counter of the computer apparatus (100).

The process thereafter (in and after S707) is the same as that of FIG. 7 of the first embodiment.

According to the second embodiment, by executing the interrupt determining part (134), the fault detecting part (136), and so on in the RAS module (130) upon occurrence of a CPU exception, the RAS function can be executed even if the CPU exception has occurred concurrently with a failure in the OS.

By executing the interrupt determining part (134), the fault detecting part (136), and so on in the RAS module (130) upon occurrence of a CPU exception, the RAS function can be executed even if the CPU exception has occurred concurrently with a failure in the hypervisor.

This embodiment has described a RAS scheme, according to which the RAS function corresponding to the interrupt determining part provided in the OS can be added, without modifying the OS or hypervisor module, to the computer apparatus in which each OS (the configuration may include one OS or a plurality of OSs) and the hypervisor are configured as independent modules.

More specifically, this embodiment has described the following (1) to (4).

(1) The "initialization procedure" of the RAS module which is called at start-up of the computer apparatus is divided into the "first initialization procedure" which is executed before the "initialization procedures" of the OS and the hypervisor and the "second initialization procedure" which is executed after completion of the "initialization procedures" of the OS and the hypervisor.

(2) In the "first initialization procedure" of the RAS module, the last portion of the "initialization procedure" of the OS is rewritten to call the "second initialization procedure" of the RAS module after the "initialization procedure" of the OS.

(3) In the "second initialization procedure" of the RAS module, the "interrupt determining part" of the OS is copied to the RAS module.

(4) In the "second initialization procedure" of the RAS module, the "interrupt detection unit" is set to call the "interrupt determining part" of the RAS module, instead of the "interrupt determining part" of the OS, upon occurrence of an interrupt.

This embodiment has also described the RAS scheme, according to which by executing the interrupt determining part, the fault detecting part, and so on in the RAS module upon occurrence of a CPU exception, the RAS function is executed even if the CPU exception has occurred concurrently with a failure in the OS.

This embodiment has also described the RAS scheme, according to which by executing the fault information collecting part in the RAS module, it is possible to determine the OS (the configuration may include one OS or a plurality of OSs) or hypervisor that was operating when a CPU exception occurred based on the program counter of the time when the CPU exception occurred, and to collect failure information from the pertinent OS or hypervisor.

Third Embodiment

This embodiment describes an outline of the operation when the interrupt detected by the interrupt detection unit (102) is a regular interrupt instead of a CPU exception.

The configuration of the computer apparatus (100) may be the same as the example configuration of the first embodiment (FIG. 1) or the configuration diagram of the second embodiment (FIG. 8).

Although the description is provided herein using the configuration of the second embodiment (the configuration with the hypervisor), the following operation is also performed in the configuration of the first embodiment (the configuration without the hypervisor).

[Third Embodiment: Description of Outline of Operation (Operation Upon Occurrence of an Interrupt)]

Figure 14:
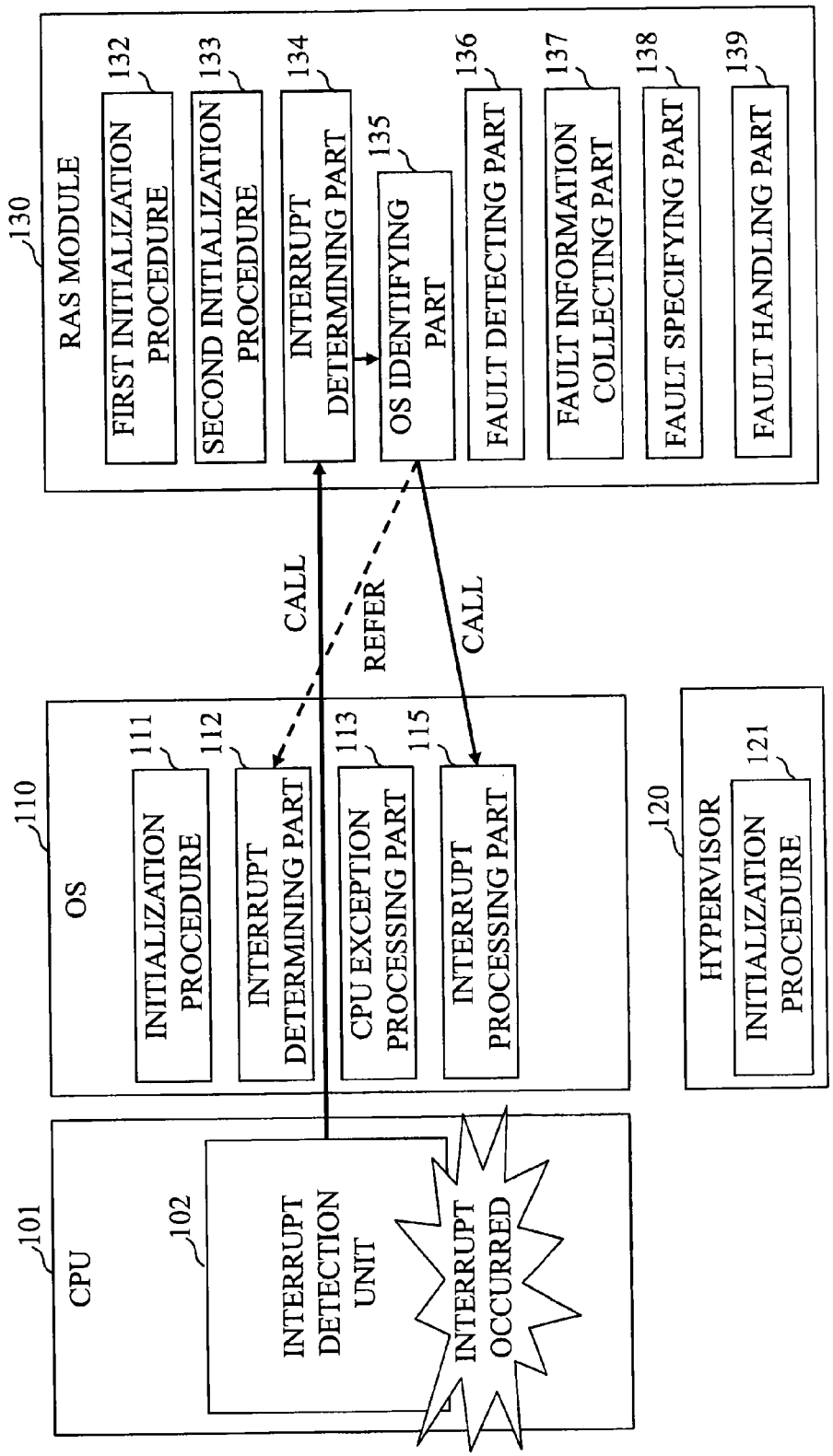
FIG. 14 is a diagram illustrating an example of operation upon occurrence of an interrupt in the computer apparatus according to a third embodiment.

FIG. 14 illustrates a flow of processing upon occurrence of an interrupt.

In FIG. 14, the memory (103), the secondary storage device (104), and the boot program (140) which are not directly relevant to the description are not illustrated.

In FIG. 14, a solid arrow indicates the flow of processing, and a dashed arrow indicates the content of processing.

It is assumed that in FIG. 14 the hypervisor (120) has carried out an interrupt mask process and does not accept any interrupt.

For this reason, if an interrupt occurs while processing by the hypervisor (120) is in progress, the interrupt detection unit (102) calls the interrupt determining part (134) of the RAS module (130) at the timing when processing transitions from the hypervisor (120) to the OS (110).

Therefore, the interrupt generation timing is when processing returns from the hypervisor (120) to the OS (110), and the program counter at the time when the interrupt occurred indicates that processing by the OS was in progress (the program counter never indicates that processing by the hypervisor was in progress).

In the first embodiment (the configuration without the hypervisor), the interrupt mask process of the hypervisor (120) described above does not exist because the hypervisor (120) itself is not present.

[Third Embodiment: Description of Outline of Operation (Operation Upon Occurrence of an Interrupt)]

FIG. 15 illustrates the operation after S703 is determined as NO in FIG. 7 or FIG. 13.

That is, if the interrupt determining part (134) determines that the interrupt is a regular interrupt instead of a CPU exception in S703 of FIG. 7 or FIG. 13, S1001 of FIG. 15 is carried out.

In FIG. 15, the OS identifying part (135) of the RAS module (130) first identifies the OS (110) that was operating when the regular interrupt occurred (S1001).

Like the fault information collecting part (137) described in the first and second embodiments, the OS identifying part (135) identifies the OS (110) that was operating when the regular interrupt occurred, based on the program counter of the computer apparatus (100).

Then, the OS identifying part (135) refers to the interrupt determining part (112) of the pertinent OS (110) to identify and call the address of the program of the interrupt processing part (115) of the pertinent OS (110) (S1002).

Then, the interrupt processing part (115) of the OS (110) is executed. Thereafter, processing returns to the OS (110) (S1003).

By carrying out the operation described in the third embodiment in the RAS function which is added according to the first embodiment or the second embodiment, the interrupt processing part of the OS can be called properly if the interrupt detected by the interrupt detection unit is a regular interrupt instead of a CPU exception.

For example, even if the registration of interrupt operation is supplemented or changed dynamically by a user operation or the like in the OS after start-up of the computer apparatus and before occurrence of an interrupt, the OS can process the interrupt properly with the operation described in the third embodiment.

This embodiment has described a RAS scheme, according to which by referring to the interrupt determining part of the OS so as to call the interrupt processing part of the corresponding OS upon occurrence of a regular interrupt instead of a CPU exception, the interrupt processing part of the OS can be called properly.

The embodiments of the present invention have been described. Two or more of these embodiments may be implemented in combination.

Alternatively, one of these embodiments may be implemented partially.

Alternatively, two or more of these embodiments may be implemented partially in combination.

The present invention is not limited to these embodiments, and various modifications are possible as required.

REFERENCE SIGNS LIST

100: computer apparatus, 101: CPU, 102: interrupt detection unit, 103: memory, 104: secondary storage device, 110: OS, 111: initialization procedure, 112: interrupt determining part, 113: CPU exception processing part, 115: interrupt processing part, 120: hypervisor, 121: initialization procedure, 130: RAS module, 132: first initialization procedure, 133: second initialization procedure, 134: interrupt determining part, 135: OS identifying part, 136: fault detecting part, 137: fault information collecting part, 138: fault specifying part, 139: fault handling part, 140: boot program

The invention claimed is:

1. A computer apparatus comprising:
a CPU (Central Processing Unit) including an interrupt detection unit that detects an interrupt, the CPU being configured to execute
an OS (Operating System) including an interrupt determining part that is called by the interrupt detection unit when the interrupt detection unit has detected an interrupt, and determines whether or not the interrupt detected by the interrupt detection unit is a CPU exception,
wherein when a RAS (Reliability Availability Serviceability) module which is a program for carrying out a process to handle a CPU exception is added to the computer apparatus,
at start-up of the computer apparatus, the CPU calls a first initialization procedure included in the RAS module, and executes the first initialization procedure to initialize a resource to be used by the RAS module;
after execution of the first initialization procedure of the RAS module, the CPU calls an initialization procedure included in the OS, and executes the initialization procedure to initialize a resource to be used by the OS; and
after execution of the initialization procedure of the OS, the CPU calls a second initialization procedure included in the RAS module, and executes the second initialization procedure to copy the interrupt determining part included in the OS to the RAS module, and to set the interrupt detection unit such that upon detecting an interrupt the interrupt detection unit calls an interrupt determining part copied to the RAS module, instead of the interrupt determining part in the OS.

2. The computer apparatus according to claim 1, further comprising:
a memory that stores program code of the OS and program code of the RAS module, wherein a last portion of program code corresponding to the initialization procedure of the OS is a jump instruction to program code which calls the initialization procedure; and wherein the CPU executes the first initialization procedure of the RAS module and changes the last portion of the program code, stored in the memory, corresponding to the initialization procedure of the OS to a jump instruction to program code of the second initialization procedure of the RAS module.

3. The computer apparatus according to claim 2, wherein the CPU executes the first initialization procedure of the RAS module and changes a last portion of the program code, stored in the memory, corresponding to the second initialization procedure of the RAS module to a jump instruction to the program code which calls the initialization procedure of the OS.

4. The computer apparatus according to claim 1, wherein the RAS module includes a CPU exception processing part that carries out a process to handle a CPU exception, wherein when the interrupt detection unit has detected an interrupt, the interrupt determining part copied to the RAS module is called by the interrupt detection unit, and wherein when the interrupt detected by the interrupt detection unit is determined as a CPU exception by the interrupt determining part copied to the RAS module, the process to handle the CPU exception is carried out by the CPU exception processing part.

5. The computer apparatus according to claim 4, wherein when the interrupt detection unit has detected an interrupt, the interrupt determining part copied to the RAS module is called by the interrupt detection unit, and wherein when the interrupt detected by the interrupt detection unit is determined as a CPU exception by the interrupt determining part copied to the RAS module, an OS that was operating when the CPU exception occurred is identified by the CPU exception processing part, and information is collected from the OS identified and the process to handle the CPU exception is carried out by the CPU exception processing part.

6. The computer apparatus according to claim 1, wherein the RAS module includes an OS identifying part that identifies an OS that was operating when an interrupt other than a CPU exception occurred, wherein when the interrupt detection unit has detected an interrupt, the interrupt determining part copied to the RAS module is called by the interrupt detection unit, and wherein when the interrupt detected by the interrupt detection unit is determined as other than a CPU exception by the interrupt determining part copied to the RAS module, an OS that was operating when the interrupt occurred is identified by the OS identifying part, and a process to handle the interrupt is carried out by the OS identified.

7. The computer apparatus according to claim 1, further comprising a hypervisor, wherein after execution of the first initialization procedure of the RAS module, the CPU calls an initialization procedure included in the hypervisor, and executes the initialization procedure to initialize a resource to be used by the hypervisor;

after execution of the initialization procedure of the hypervisor, the CPU calls the initialization procedure included in the OS, and executes the initialization procedure to initialize the resource to be used by the OS; and after execution of the initialization procedure of the OS, the CPU calls the second initialization procedure included in the RAS module, and executes the second initialization procedure.

8. The computer apparatus according to claim 7, wherein the RAS module includes a CPU exception processing part that carries out a process to handle a CPU exception, wherein when the interrupt detection unit has detected an interrupt, the interrupt determining part copied to the RAS module is called by the interrupt detection unit, and wherein when the interrupt detected by the interrupt detection unit is determined as a CPU exception by the interrupt determining part copied to the RAS module, a hypervisor that was operating when the CPU exception occurred is identified by the CPU exception processing part, and information is collected from the hypervisor identified and the process to handle the CPU exception is carried out by the CPU exception processing part.

9. A control method of a computer apparatus including a CPU (Central Processing Unit) including an interrupt detection unit that detects an interrupt, the CPU being configured to execute an OS (Operating System) including an interrupt determining part that is called by the interrupt detection unit when the interrupt detection unit has detected an interrupt, and determines whether or not the interrupt detected by the interrupt detection unit is a CPU exception, wherein a RAS (Reliability Availability Serviceability) module which is a program for carrying out a process to handle a CPU exception is added to the computer apparatus, the control method of the computer apparatus comprising:

calling, by the CPU and at start-up of the computer apparatus, a first initialization procedure included in the RAS module, and executing the first initialization procedure to initialize a resource to be used by the RAS module;

calling, by the CPU and after execution of the first initialization procedure of the RAS module, an initialization procedure included in the OS, and executing the initialization procedure to initialize a resource to be used by the OS; and calling, by the CPU and after execution of the initialization procedure of the OS, a second initialization procedure included in the RAS module, and executing the second initialization procedure to copy the interrupt determining part included in the OS to the RAS module, and to set the interrupt detection unit such that upon detecting an interrupt the interrupt detection unit calls an interrupt determining part copied to the RAS module, instead of the interrupt determining part in the OS.

* * * * *